H. F. STRATTON.
ELECTRIC CONTROLLER.
APPLICATION FILED DEC. 7, 1917.
1,305,951.
Patented June 3, 1919.
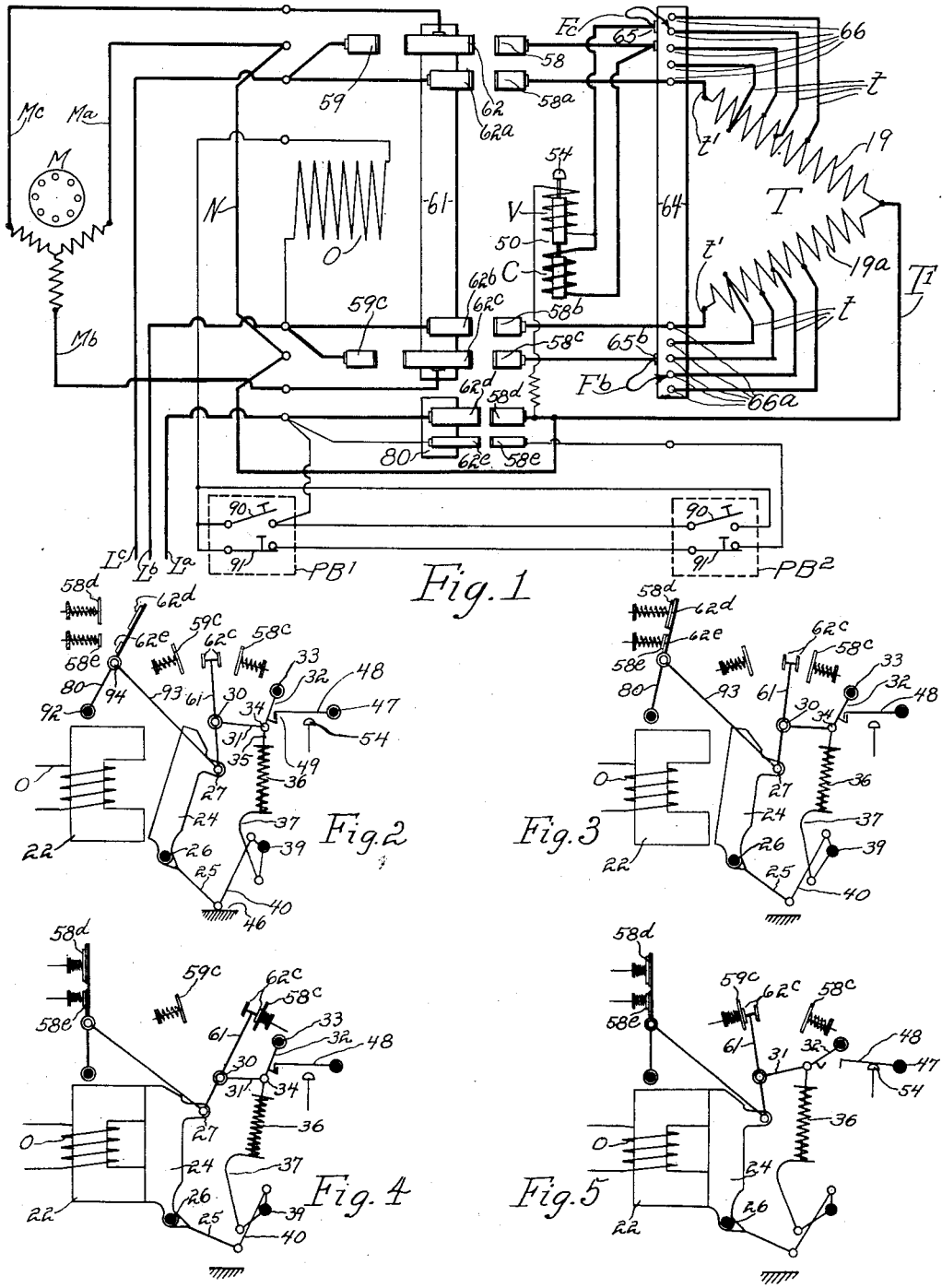
INVENTOR.
Harry F. Stratton
BY F. N. Barber
ATTORNEY.

UNITED STATES PATENT OFFICE.

HARRY F. STRATTON, OF CLEVELAND, OHIO, ASSIGNOR TO THE ELECTRIC CONTROLLER & MANUFACTURING COMPANY, OF CLEVELAND, OHIO, A CORPORATION OF OHIO.

ELECTRIC CONTROLLER.

1,305,951.

Specification of Letters Patent.

Patented June 3, 1919.

Application filed December 7, 1917. Serial No. 205,915.

*To all whom it may concern:*

Be it known that I, HARRY F. STRATTON, a citizen of the United States, residing at Cleveland, in the county of Cuyahoga and State of Ohio, have invented new and useful Improvements in Electric Controllers, of which the following is a specification.

My invention relates to apparatus for controlling electric motors, and particularly to controllers for accelerating motors from standstill to normal running speeds.

While my invention in its broad aspects relates to the control of electric motors in general, it may be most readily disclosed as a modification of the electric control apparatus shown and described in my Patent, No. 1,225,686, issued May 8th, 1917, and to simplify this application, my invention will be so described. Reference may be made to that patent for a fuller description than is herein given of the type of controlling apparatus embodying this invention.

In that patent I show an automatic electromagnetically actuated apparatus for starting an induction motor of the squirrel cage type. A movable contact-carrying switch arm first moves to the starting position, thereby connecting the motor to the supply mains through a transformer. When the motor has started and the electrical conditions therein are suitable, the movable switch arm moves to the running position, connecting the motor directly to the supply mains. The movable contact-carrying switch arm is actuated by a single electromagnet through the agency of a mechanism.

One of the principal objects of this invention is to provide a motor-controlling apparatus of the type just described, which will entirely disconnect the motor from the supply mains when the apparatus is in the neutral or "off" position, employing therefor the fewest possible electrical contacts; and which will have the contacts so arranged that they will be subjected to the least possible wear and will require the least possible amount of energy for their operation.

Another object is to arrange the contacts of the apparatus so that the operating magnet may be actuated from a distance to start and stop the motor, but so that if the motor stops upon failure or interruption of the voltage on the magnet, the apparatus will not automatically restart the motor upon the return of the voltage.

Another object is to arrange the contacts of the apparatus so that the apparatus may be actuated from a distance at any one of several stations, to start and stop the motor, but so that if it is stopped by an operator at one station, it cannot be started by an operator at another station against the will of the first operator.

In the drawings, Figure 1 is a diagram of connections of a motor control system embodying my invention. Figs. 2, 3, 4, and 5 are diagrams of a controller mechanism, which I employ in carrying out my invention, the parts thereof being shown in different positions in the several diagrams.

Referring to Fig. 1, I have shown at $L^a$, $L^b$, and $L^c$, three mains from a source of three-phase alternating electromotive force for supplying current to the motor control system. M is a squirrel-cage induction motor. The transformer T, which I have shown as a three-phase auto-transformer, has the open-delta coils 19 and $19^a$. The coils are each shown with tap connections $t$ and the open or upper-end connections $t'$. The lower ends of the coils are connected to the common conductors $T'$. By means of the taps $t$, the transformer is arranged to give 40, 58, 70, and 85% of full line voltage. The connections $t$ and $t'$ from the transformer terminate at suitable terminals 66 and $66^a$ on a stationary insulating cross-arm 64. Flexible conductors $F^c$ and $F^b$ each have one end secured to the cross-arm 64 at 65 and $65^b$ respectively, and the other end free to be moved for adjustment purposes to connect with one of the terminals 66 or $66^a$ respectively. By this selective adjustment one or the other of the transformer taps $t$ may be selected to give the starting voltage for the motor.

I provide a movable, double-throw switch-bar 61, carrying contacts 62, $62^a$, $62^b$, $62^c$, and a single-throw switch-bar 80, carrying contacts $62^d$ and $62^e$. The switch-bar 61 is adapted to move in the right-hand direction in Fig. 1, to cause the contacts 62 to $62^c$ to engage, respectively, stationary starting contacts 58, $58^a$, $58^b$, $58^c$, and is also adapted to move in the left-hand direction to cause the contacts 62 and 62ᶜ to engage the stationary running contacts 59 and 59ᶜ. The switch-bar 80 is adapted to move in the right-hand direction only to cause the movable contacts 62ᵈ and 62ᵉ to engage, respectively, the stationary contacts 58ᵈ and 58ᵉ.

The switch-bars 61 and 80 are moved by a mechanism which is in turn actuated by an electromagnet having the winding O. This mechanism will be described later. The winding O is connected for energization across the supply mains Lᵃ and Lᵇ, and is controlled by push-button switches PB¹ and PB², each having a starting button 90 and a stop button 91. Only two push-button switches are shown, but it will be understood that any number may be employed and located at convenient stations.

The movement of the switch-bar 61 from the right-hand or starting position to the left-hand or running position is under the control of a trip relay 50 having the shunt or holding winding V and the current or series winding C. The shunt coil V has one end in electrical connection with the terminal 65, and hence with the selected voltage tap $t$ of the coil 19 of the transformer T. The other end of the winding is connected permanently to the common conductor T'. The series coil C is connected in the path of the main starting current of one of the phases, as will be described. The relay 50, when it operates, lifts vertically a peen 54. This relay is shown and described in the above mentioned patent.

To start the motor M, one of the starting buttons 90 is closed, causing the winding O to be energized, the current flowing from the main Lᵇ through the winding O and the closed button 90 to the main Lᵃ. Through the agency of the mechanism to be described, the switch-bars 61 and 80 move to the right, the contacts 62ᵈ and 62ᵉ on the bar 80 first engaging the contacts 58ᵈ and 58ᵉ, and subsequently the contacts 62 and 62ᵃ, 62ᵇ, 62ᶜ, engaging, respectively, the starting contacts 58, 58ᵃ, 58ᵇ, and 58ᶜ. In this position the supply main Lᵇ is connected through the contacts 62ᵇ and 58ᵇ to the open terminal of the transformer coil 19ᵃ, and the supply main Lᶜ is connected through the contacts 62ᵃ and 58ᵃ to the open end of the transformer coil 19, and the supply main Lᵃ is connected through the contacts 62ᵈ and 58ᵈ and the conductor T' to the remaining ends of the transformer windings. The contacts 62ᵉ and 58ᵉ establish a retaining circuit for the winding O through the stop buttons 91, the circuit being from the supply main Lᵇ through the winding O, the stop buttons 91 in series, and the contacts 58ᵉ and 62ᵉ to the main Lᵃ. The starting button 90 may now be released and permitted to move to its normal or open position. With the contacts in the position just described, the motor lead Mᶜ is connected to the second terminal 66 through the contacts 62 and 58, the current coil C and tap connector Fᶜ. The motor lead Mᵇ is connected to the second terminal 66ᵃ through the contacts 62ᶜ and 58ᶜ, and the tap connector Fᵇ. The motor lead Mᵃ is permanently connected to the common conductor T' through the conductor N. Thus, only a portion of the transformer is connected to the motor leads Mᵇ and Mᶜ, causing the motor to start under a voltage less than the line voltage.

For any given connection of the tap connectors Fᵇ and Fᶜ with the tap terminals 66ᵃ and 66, the upward pull of the coil V which opposes the downward pull of the coil C as described in the above mentioned patent, remains practically unchanged for the same line voltage, but the downward pull of the coil C varies with the current through the motor. When the movable switch-bar 61 is first moved into starting position, the rush of current in the coil C causes the coil C to overpower the coil V, but when the motor current decreases to such a value that the coil C is overpowered by the coil V, the peen 54 moves upwardly and actuates the mechanism to release the bar 61, whereupon the bar 61 moves to the running position. The bar 80, however, does not move when the bar 61 moves to the running position. With the contacts in the running position, the supply main Lᵇ is connected directly to the motor lead Mᵇ through the contacts 59ᶜ and 62ᶜ, and the supply main Lᶜ is connected directly to the motor lead Mᶜ through the contacts 59 and 62, and the supply main Lᵃ is connected directly to the motor lead Mᵃ through the contacts 62ᵈ and 58ᵈ and the conductor N. The transformer T and the coils C and V are now disconnected from the supply mains, and the full voltage of the source of current supply is impressed on the motor, whereby the motor is quickly accelerated to running speed.

To stop the motor, one of the stop buttons 91 is opened which breaks the maintaining circuit to the winding O. Thereupon, through the mechanism to be described, the switch-bar 61 moves to the right from the running position to the neutral or "off" position, and the bar 80 moves to the left to the neutral or "off" position. In this position it will be noted that all three leads of the motor are disconnected from the supply mains. Also it will be noted that the maintaining circuit of the winding O is open at the contacts 62ᵉ and 58ᵉ. This latter provision is made so that whenever the apparatus moves to the "off" position, whether by opening one of the stop buttons 91, or by the failure or interruption of the voltage supply on the winding O, the apparatus will not be automatically actuated to start the motor upon the return of the voltage supply; the motor can only be started at the will of the operator, by means of the start buttons 90. With this arrangement, if the operator at one push-button switch wishes to prevent the starting of the motor by an operator at another push-button switch, he may do so by holding open the stop button 91 at his station, thus holding open the maintaining circuit of the winding O. The failure of voltage supply on the winding O mentioned above may be caused abnormally by failure of the supply voltage on the supply mains, or by an accidental ground or other failure of the apparatus itself; or it may be occasioned at will by opening one of the stop buttons 91, in response to other predetermined conditions by the use of a relay or other means.

Attention is also called to the fact that to start the motor on the auto-transformer and then connect it directly to the line, and then to entirely disconnect the motor from the line in the "off" position, only seven main contact points are required.

The mechanism of the apparatus by which the several movements of the switch-bars 61 and 80 are effected, will now be considered in connection with Figs. 2 to 5. The mechanism in these figures is shown diagrammatically. Mechanism of this same general type is described in detail in the hereinbefore mentioned patent, corresponding parts having the same reference characters.

In Figs. 2 to 5, the winding O energizes the stationary U-shaped electromagnet 22 and the movable armature 24. The armature turns on the stationary pivot 26, and is shown in the "off" or neutral position in Fig. 2, the partially closed position in Fig. 3, and full-closed positions in Figs. 4 and 5. In these figures the stationary contacts $58^d$ and $58^e$, the movable contacts $62^d$ and $62^e$, the stationary starting contact $58^c$, the stationary running contact $59^c$ and movable contact $62^c$ are shown with the same reference characters as in Fig. 1. The bar 80 is shown pivoted to a stationary pivot 92, and a connecting rod 93, pivoted to the bar 80 at 94, and to the armature 24 at 27, communicates the movement of the armature to the bar. The bar 61 is pivoted to the armature at 27. The toggle member 32, mounted on the stationary pivot 33, is pivotally connected at 34 with a correlated toggle member 31, the remaining end of which is pivoted to the bar 61 at 30. Upon a stationary pivot 47 is a latch member 48, engaging the toggle member 32 at 49. The peen 54 is arranged under the latch member 48, and is adapted upon rising under the influence of the relay 50 (Fig. 1), to lift the latch member, as shown in Fig. 5. The lower end of the armature 24 carries an arm 25, pivotally connected to one end of a connecting rod 40. The other end of the connecting rod 40 is pivotally connected to one arm of a bell-crank mounted on the stationary pivot 39. The other end of the bell-crank is pivotally connected to a lower compression member 37. An upper compression member 35 is pivoted to the toggle 31—32, at 34, and between the upper and lower compression members is a compression spring 36. The clockwise movement of the armature 24 about the pivot 26 is stopped by the engagement of the lower end of the arm 25 with a stationary stop 46. In Fig. 2 the parts are shown in their normal, or "off" position. When the magnet O is energized, the armature 24 is attracted by the magnet 22, and rotates counter clockwise about the pivot 26. The movement of the armature acting through the connecting rod 93 moves the bar 80 and closes the contacts $62^d$, $58^d$, and $62^e$, $58^e$, as shown in Fig. 3. Further movement of the armature into the position Fig. 4 closes the contacts $62^c$ and $58^c$. During this movement it will be noted that the toggle member 32 and the pivot 34 remain fixed in position, because of the latch 48 and the stationary pivot 33, and that the pivot 27, rotating clockwise about the pivot 30, causes the contact $62^c$ to rotate clockwise about the pivot 30 to engage the contacts $62^c$ and $58^c$. At the same time the counter clockwise movement of the arm 25 about the pivot 26, acting through the connecting rod 40, rotates the bell crank on the pivot 39 clockwise, lifting the lower compression member 37 and compressing the spring 36. As described above, when the starting current in the coil C of the relay 30, falls to a certain value, the peen 54 rises. This peen on striking the latch member 48, lifts it, and the spring 36 expanding straightens out the toggle 31—32, and the parts move to position shown in Fig. 5, in which the straightening of the toggle has rotated the bar 61 counter clockwise about the pivot 27, causing the contact $62^c$ to leave the contact $58^c$ and engage the contact $59^c$. It will be noted that, in the above described operation, the contacts $58^d$ and $58^e$ are first closed, and that subsequently the contacts $62^c$ and $58^c$ close, and that while the contact $62^c$ disengages the contact $58^c$ and engages the contact $59^c$, the contacts $62^d$ and $62^e$ remain engaged with the contacts $58^d$ and $58^e$.

When the magnet is deënergized by opening the circuit of the winding O, the parts move from the position shown in Fig. 5 to that in Fig. 2, and it is to be particularly noted that the contact $62^c$ leaves the contact $59^c$ before the contacts $58^d$ and $58^e$ are opened; thus, no current is broken on the contacts $58^d$ and $58^e$, since the current has been interrupted on contacts previously opened. These contacts $58^d$ and $58^e$, therefore, may be arranged to have only a slight opening and closing movement, and to require little motive power from the magnet for their operation, making possible the use of a magnet of smaller capacity than would otherwise be necessary. These contacts also are not subjected to the wear of making and breaking currents.

While in the diagrammatic mechanisms, Figs. 2 to 5, I have shown single contacts 59ᶜ, 62ᶜ and 58ᶜ, it will be understood that the descriptions of the operations of these single contacts applies to the corresponding sets of contacts in Fig. 1, viz., 59, 59ᶜ, and 62, 62ᵃ, 62ᵇ, 62ᶜ, and 58, 58ᵃ, 58ᵇ, 58ᶜ.

I claim:

1. In an electric controller, a source of voltage supply, two sets of stationary contacts, a set of movable contacts, electro-responsive means for causing the movable contacts to successively engage the two sets of stationary contacts and for responding protectively upon failure of the voltage supply, and means for preventing its response upon a recurrence of voltage supply, the second means including contacts closed by the electro-responsive means when the set of movable contacts are in engagement with the first set of stationary contacts and remaining closed when the movable contacts engage the second set of stationary contacts.

2. In an electric controller, a source of voltage supply, two sets of stationary contacts, a set of movable contacts, a single electromagnetic means for causing the movable contacts to successively engage the two sets of stationary contacts and for responding protectively upon the deënergization thereof by failure of the voltage supply, and means for preventing the reënergization of the electromagnetic means upon the recurrence of voltage supply, the second means including contacts closed by the electro-responsive means when the set of movable contacts are in engagement with the first set of stationary contacts and remaining closed when the movable contacts engage the second set of stationary contacts.

3. In an electric controller, a source of voltage supply, two sets of stationary contacts, a set of movable contacts, an electro-responsive means for causing the movable contacts to move into engagement with one set of stationary contacts and then out of engagement therewith and into engagement with the other set, and for causing the movable contacts to move to a disengaged position upon the failure of voltage supply, and means for preventing the movement of the movable contacts from the disengaged position upon the recurrence of voltage supply, the second means including contacts closed by the electro-responsive means when the set of movable contacts are in engagement with the first set of stationary contacts and remaining closed when the movable contacts engage the second set of stationary contacts.

4. In a motor controller, a motor, a source of voltage supply, starting and running contacts for the motor, movable contacts, a single electromagnetic means for causing the movable contacts to move successively into engagement with the starting and running contacts to start the motor and for responding to a failure of voltage supply to cause the movable contacts to move to a disengaged position, and means for preventing the restarting of the motor upon the recurrence of voltage supply, the second means including contacts closed by the electro-responsive means when the set of movable contacts are in engagement with the first set of stationary contacts and remaining closed when the movable contacts engage the second set of stationary contacts.

5. In a motor controller, a motor, a source of voltage supply, starting and running contacts for the motor, movable contacts, electromagnetic means for causing the movable contacts to move successively into engagement with the starting and running contacts to start the motor and for responding to a failure of voltage supply to cause the movable contacts to move to a disengaged position, means for preventing the automatic restarting of the motor upon the recurrence of voltage supply, and means for causing a failure of voltage supply, the second means including contacts closed by the electro-responsive means when the set of movable contacts are in engagement with the first set of stationary contacts and remaining closed when the movable contacts engage the second set of stationary contacts.

6. In a motor controller, a motor, a source of voltage supply, starting and running contacts for the motor, movable contacts, electromagnetic means for causing the movable contacts to move successively into engagement with the starting and running contacts to start the motor and for responding to a failure of voltage supply to cause the movable contacts to move to a disengaged position to stop the motor, means for preventing the automatic restarting of the motor upon the recurrence of voltage supply, and means for restarting the motor, the second means including contacts closed by the electro-responsive means when the set of movable contacts are in engagement with the first set of stationary contacts and remaining closed when the movable contacts engage the second set of stationary contacts.

7. In a motor controller, a motor, a source of voltage supply, starting and running contacts for the motor, movable contacts, a single electromagnetic means for causing the movable contacts to move successively into engagement with the starting and running contacts to start the motor and for responding to a failure of voltage supply to cause the movable contacts to move to a disengaged position, means for preventing the automatic restarting of the motor upon the recurrence of voltage supply, means for causing a failure of voltage supply, and means for restarting the motor, the second means including contacts closed by the electro-responsive means when the set of movable contacts are in engagement with the first set of stationary contacts and remaining closed when the movable contacts engage the second set of stationary contacts.

8. In an electric controller, a source of voltage supply, two sets of stationary contacts, a set of movable contacts, electro-responsive means for causing the movable contacts to successively engage the two sets of stationary contacts and for responding protectively upon failure of the voltage supply, and a contact controlling the energization of the electro-responsive means and adapted to open upon failure of the voltage supply to prevent the response of the electro-responsive means upon a recurrence of voltage supply, the said contact closing when the movable contacts engage the first set of stationary contacts and remaining closed when the movable contacts engage the second set of stationary contacts.

9. In an electric controller, a source of voltage supply, two sets of stationary contacts, a set of movable contacts, a single electromagnetic means for causing the movable contacts to successively engage the two sets of stationary contacts and for responding protectively upon the deënergization thereof by failure of the voltage supply, and a contact controlling the energization of the electromagnetic means operated thereby and adapted to open upon failure of the voltage supply to prevent the reënergization of the electromagnetic means upon the recurrence of voltage supply, the said contact closing when the movable contacts engage the first set of stationary contacts and remaining closed when the movable contacts engage the second set of stationary contacts.

10. In an electric controller, a source of voltage supply, two sets of stationary contacts, a set of movable contacts, an electro-responsive means for causing the movable contacts to successively engage the two sets of stationary contacts, and for causing the movable contacts to move to a disengaged position upon failure of the voltage supply, and a contact controlling the electro-responsive means, adapted to open when the movable contacts move to the disengaged position for preventing the movement of the movable contacts upon the recurrence of the voltage supply, the said contact closing when the movable contacts engage the first set of stationary contacts and remaining closed when the movable contacts engage the second set of stationary contacts.

11. In an electric controller, a source of voltage supply, two sets of stationary contacts, a set of movable contacts, an electro-responsive means for causing the movable contacts to successively engage the two sets of stationary contacts, and for causing the movable contacts to move to a disengaged position when deënergized by failure of the voltage supply, and a contact controlling the energization of the electro-responsive means and operated thereby to close and remain closed whenever the electro-responsive means is energized but to open upon the occurrence of voltage supply failure, preventing the automatic reënergization of the electro-responsive means upon the recurrence of voltage supply.

12. In a motor controller, a motor, a source of voltage supply, starting and running contacts for the motor, movable contacts, a single electro-responsive means for causing the movable contacts to move into engagement with the starting contacts and subsequently out of engagement therewith and into engagement with the running contacts to start the motor, and to move to a disengaged position to disconnect the motor from the voltage supply upon failure thereof, and a contact controlling the electro-responsive means and operated thereby to close and remain closed during the starting of the motor but to open upon failure of voltage supply, preventing the automatic restarting of the motor upon the recurrence of voltage supply.

13. In an electric controller, a source of supply voltage, two sets of stationary contacts, a set of movable contacts, an electromagnetic means for causing the movable contacts to move in one direction to engage one set of stationary contacts and in another direction to engage the other set of stationary contacts, and to move to a disengaged position upon deënergization of the electromagnetic means by failure of the voltage supply, and a contact controlling the energization of the electromagnetic means and operated thereby in one direction only to close and remain closed but to open upon the failure of voltage supply, preventing the automatic reënergization of the electromagnetic means upon a recurrence of voltage supply, the said contact closing when the movable contacts engage the first set of stationary contacts and remaining closed when the movable contacts engage the second set of stationary contacts.

14. In an electric controller, a source of voltage supply, two sets of stationary contacts, a set of movable contacts, electro-responsive means for causing the movable contacts to successively engage the two sets of stationary contacts, an operating circuit energizing the electro-responsive means, a maintaining circuit thereof, a contact controlling the operating circuit, a contact controlling the maintaining circuit closed and caused to remain closed by the electro-responsive means but opened upon a failure of voltage supply, preventing the automatic reënergization of the means upon a recurrence of voltage supply, the said contact closing when the movable contacts engage the first set of stationary contacts and remaining closed when the movable contacts engage the second set of stationary contacts.

15. In an electric controller, a source of voltage supply, two sets of stationary contacts, a set of movable contacts, electro-responsive means for causing the movable contacts to successively engage the two sets of stationary contacts, an operating circuit energizing the electro-responsive means, a maintaining circuit therefor, a contact controlling the operating circuit, a contact controlling the maintaining circuit, and a second contact controlling the maintaining circuit closed and caused to remain closed by the electro-responsive means but to open the maintaining circuit upon failure of the voltage supply, the last named contact closing when the movable contacts engage the first set of stationary contacts and remaining closed when the movable contacts engage the second set of stationary contacts.

16. In a motor controller, a motor, a source of voltage supply, starting contacts, running contacts, movable contacts, a single electromagnetic means for causing the movable contacts to successively engage the starting contacts, disengage the starting contacts, engage the running contacts to start the motor, and move to a disengaged position upon failure of voltage supply, an operating circuit energizing the electromagnetic means, a maintaining circuit therefor, a contact in the operating circuit, a contact in the maintaining circuit, and a second contact in the maintaining circuit closed and caused to remain closed by the electromagnetic means when the movable contacts move to engage the starting contacts, to remain closed when the movable contacts move to engage the running contacts, but to open when the movable contacts move to the disengaged position, preventing the reënergization of the electromagnetic means upon the recurrence of voltage supply.

17. In an electric controller, a three-wire supply circuit, a three-wire receiving circuit, an electric power transmitting device, seven contact points adapted to connect the receiving circuit to the supply circuit through the transmitting device, then connect with the receiving circuit directly to the supply circuit, and then entirely disconnect the receiving circuit from the supply circuit, and a single means for operating the contact points.

18. In an electric controller, a three-wire supply circuit, a three-wire receiving circuit, an electric power transmitting device, seven contact points adapted to connect the receiving circuit to the supply circuit through the transmitting device, then connect the receiving circuit directly to the supply circuit, and then entirely disconnect the receiving circuit and the transmitting device from the supply circuit, and a single means for operating the contact points.

19. In a motor controller, a three-wire supply circuit, a motor having a three-wire receiving circuit, a voltage changing means, seven contact points adapted to connect the receiving circuit of the motor to the supply circuit through the voltage-changing means, then disconnect the receiving circuit from the voltage-changing means and connect it directly to the supply circuit, and then entirely disconnect the motor from the supply circuit, and a single means for operating the contact points.

20. In a motor controller, a three-phase induction motor, a three-phase source of supply, an auto-transformer, seven contact points adapted to connect the motor to the source of supply through the transformer, then disconnect the motor from the transformer and connect the motor directly to the source of supply, and then entirely disconnect the motor and the transformer from the source of supply, and a single means for operating the contact points.

21. In an electric controller, a three-wire source of supply, a three-wire receiving circuit, an electric power transmitting means, two sets of stationary contacts, a set of movable contacts adapted to engage the stationary contacts at seven contact points, and means for causing the movable contacts to engage one set of stationary contacts to connect the receiving circuit to the supply circuit through the transmitting means, and to engage the other set of stationary contacts to connect the receiving circuit directly to the supply circuit, and to move to a disengaged position to entirely disconnect the receiving circuit from the supply circuit.

22. In an electric controller, a three-wire source of supply, a three-wire receiving circuit, an electric power transmitting means, two sets of stationary contacts, a set of movable contacts adapted to engage the stationary contacts at seven contact points, and electro-responsive means for causing the movable contacts to engage one set of stationary contacts to connect the receiving circuit to the supply circuit through the transmitting means and to engage the other set of stationary contacts to connect the receiving circuit directly to the supply circuit, and, upon the deënergization of the electro-responsive means, to move to a disengaged position to entirely disconnect the receiving circuit from the supply circuit.

23. In an electric controller, a three-wire supply circuit, a three-wire receiving circuit, a power-transmitting means, stationary and movable contacts comprising seven contact points, and means for causing the engagement of some of the movable and stationary contacts to connect the receiving circuit to the supply circuit through the transmitting means, the disengagement of some of said engaged movable and stationary contacts, and the engagement of some of the movable and stationary contacts to connect the receiving circuit directly to the supply circuit, and the disengagement of all of the contacts to entirely disconnect the receiving circuit from the supply circuit.

24. In an electric controller, a three-wire supply circuit, a three-wire receiving circuit, a power-transmitting means, stationary and movable contacts comprising seven contact points, and means for causing the engagement of some of the movable and stationary contacts and subsequently of others of the movable and stationary contacts to connect the receiving circuit to the supply circuit through the transmitting means, the engagement of some of the movable and stationary contacts to connect the receiving circuit directly to the supply circuit, and the disengagement of all of the contacts to entirely disconnect the receiving circuit from the supply circuit.

25. In an electric controller, a three-wire supply circuit, a three-wire receiving circuit, a power-transmitting means, stationary and movable contacts comprising seven contact points, and means for causing the engagement of some of the movable and stationary contacts and subsequently of others of the movable and stationary contacts to connect the receiving circuit to the supply circuit through the transmitting means, the disengagement of some of said engaged movable and stationary contacts and the engagement of some of the movable and stationary contacts to connect the receiving circuit directly to the supply circuit, and the disengagement of all the contacts to entirely disconnect the receiving circuit from the supply circuit.

26. In an electric controller, a three-wire supply circuit, a three-wire receiving circuit, a power-transmitting means, stationary and movable contacts comprising seven contact points, and means for causing the engagement of some of the movable and stationary contacts to connect the receiving circuit to the supply circuit through the transmitting means, the engagement of some of the movable and stationary contacts to connect the receiving circuit directly to the supply circuit, and the disengagement of some of and subsequently the remainder of the contacts to entirely disconnect the receiving circuit from the supply circuit.

27. In an electric controller, a three-wire supply circuit, a three-wire receiving circuit, a power-transmitting means, stationary and movable contacts comprising seven contact points, and means for causing the engagement of some of the movable and stationary contacts to connect the receiving circuit to the supply circuit through the transmitting means, the disengagement of some of said engaged movable and stationary contacts and the engagement of some of the movable and stationary contacts to connect the receiving circuit directly to the supply circuit, and the disengagement of some of and subsequently the remainder of the contacts to entirely disconnect the receiving circuit from the supply circuit.

28. In an electric controller, a three-wire supply circuit, a three-wire receiving circuit, a power-transmitting means, stationary and movable contacts comprising seven contact points, and means for causing the engagement of some of the movable and stationary contacts and subsequently of others of the movable and stationary contacts to connect the receiving circuit to the supply circuit through the transmitting means, the engagement of some of the movable and stationary contacts to connect the receiving circuit directly to the supply circuit, and the disengagement of some of and subsequently the remainder of the contacts to entirely disconnect the receiving circuit from the supply mains.

29. In an electric controller, a three-wire supply circuit, a three-wire receiving circuit, a power-transmitting means, stationary and movable contacts comprising seven contact points, and means for causing the engagement of some of the movable and stationary contacts and subsequently of others of the movable and stationary contacts to connect the receiving circuit to the supply circuit through the transmitting means, the disengagement of some of said engaged movable and stationary contacts and the engagement of some of the movable and stationary contacts to connect the receiving circuit directly to the supply circuit, and the disengagement of some of and subsequently the remainder of the contacts to entirely disconnect the receiving circuit from the supply circuit.

30. In a controlling device for electric circuits, stationary contacts, movable contacts, and a means for moving the movable contacts in one direction to engage some of the stationary contacts to make one set of circuit connections, and in another direction to disengage some only of the said engaged stationary contacts and to engage other stationary contacts to make another set of circuit connections, and for disengaging all of the contacts.

31. In a controlling device for electric circuits, stationary contacts, movable contacts, and a means for moving some and subsequently others of the movable contacts in one direction to engage some of the stationary contacts to make one set of circuit connections, for moving some of the movable contacts in another direction to engage other stationary contacts to make another set of circuit connections, and for disengaging all of the contacts.

32. In a controlling device for electric circuits, stationary contacts, movable contacts, and a means for moving some and subsequently others of the movable contacts in one direction to engage some of the stationary contacts to make one set of circuit connections, for moving some of the engaged movable contacts in another direction to disengage some of said engaged stationary contacts and to engage other stationary contacts to make another set of circuit connections, and for disengaging all of the contacts.

33. In a controlling device for electric circuits, stationary contacts, movable contacts, and a means for moving the movable contacts in one direction to engage some of the stationary contacts to make one set of circuit connections, for moving some of the movable contacts in another direction to engage other stationary contacts to make another set of circuit connections, and for disengaging some of and subsequently the remainder of the contacts.

34. In a controlling device for electric circuits, stationary contacts, movable contacts, and a means for moving the movable contacts in one direction to engage some of the stationary contacts to make one set of circuit connections, and in another direction to disengage some of the said engaged stationary contacts and to engage other stationary contacts to make another set of circuit connections, and for disengaging some of and subsequently the remainder of the contacts.

35. In a controlling device for electric circuits, stationary contacts, movable contacts, and a means for moving some and subsequently others of the movable contacts in one direction to engage stationary contacts to make one set of circuit connections, for moving some of the movable contacts in another direction to engage other stationary contacts to make another set of circuit connections, and for disengaging some of and subsequently the remainder of the contacts.

36. In a controlling device for electric circuits, stationary contacts, movable contacts, and a means for moving some and subsequently others of the movable contacts in one direction to engage with some of the stationary contacts to make one set of circuit connections, for moving some of the movable contacts in another direction to disengage some of the said engaged stationary contacts and to engage other stationary contacts to make another set of circuit connections, and for disengaging some of and subsequently the remainder of the contacts.

37. In a controlling device for electric circuits, an electromagnetic means, stationary and movable contacts including contacts controlling the circuit of the electromagnetic means, and means controlled by the electromagnetic means whereby the movable contacts are moved in one direction to engage some of the stationary contacts to make one set of circuit connections including a control circuit for the electromagnetic means, and in another direction to disengage some of the said engaged stationary contacts exclusive of the control contacts, and to engage other stationary contacts to make another set of circuit connections, and whereby all the contacts are disengaged.

38. In a controlling device for electric circuits, an electromagnetic means, stationary and movable contacts including contacts controlling the circuit of the electromagnetic means, and means controlled by the electromagnetic means whereby some of the movable contacts including the control contacts, and subsequently others of the movable contacts are moved in one direction to engage some of the stationary contacts to make one set of circuit connections including a control circuit for the electromagnetic means, and some of the movable contacts are moved in another direction to engage other stationary contacts to make another set of circuit connections, and whereby all the contacts are disengaged.

39. In a controlling device for electric circuits, an electromagnetic means, stationary and movable contacts including contacts controlling the circuit of the electromagnetic means, and means controlled by the electromagnetic means whereby some of the movable contacts including the control contacts, and subsequently others of the movable contacts are moved in one direction to engage some of the stationary contacts to make one set of circuit connections including a control circuit for the electromagnetic means, and in another direction to disengage some of the said engaged stationary contacts exclusive of the control contacts, and to engage them with other stationary contacts to make another set of circuit connections, and whereby all the contacts are disengaged.

40. In a controlling device for electric circuits, an electromagnetic means, stationary and movable contacts including contacts controlling the circuit of the electromagnetic means, and means controlled by the electromagnetic means whereby the movable contacts are moved in one direction to engage some of the stationary contacts to make one set of circuit connections including a control circuit for the electromagnetic means, and in another direction to engage other stationary contacts to make another set of circuit connections, and whereby some of the said engaged contacts exclusive of the control contacts and subsequently the remainder of the engaged contacts are disengaged.

41. In a controlling device for electric circuits, an electro-magnetic means, stationary and movable contacts including contacts controlling the circuit of the electromagnetic means, and means controlled by the electromagnetic means whereby the movable contacts are moved in one direction to engage some of the stationary contacts to make one set of circuit connections including a control circuit for the electromagnetic means, and in another direction to disengage some of the said engaged stationary contacts exclusive of the control circuit contacts, and to engage other stationary contacts to make another set of circuit connections, and whereby some of the said engaged contacts exclusive of the control contacts and subsequently the remainder of the engaged contacts are disengaged.

42. In a controlling device for electric circuits, an electromagnetic means, stationary and movable contacts including contacts controlling the circuit of the electromagnetic means, and means controlled by the electromagnetic means whereby some of the movable contacts including the control contacts, and subsequently others of the movable contacts are moved in one direction to engage some of the stationary contacts to make one set of circuit connections including a control circuit for the electromagnetic means, and some of the movable contacts are moved in another direction to engage other stationary contacts to make another set of circuit connections, and whereby some of the said engaged contacts exclusive of the control contacts and subsequently the remainder of the engaged contacts are disengaged.

43. In a controlling device for electric circuits, an electromagnetic means, stationary and movable contacts including contacts controlling the circuit of the electromagnetic means, and means controlled by the electromagnetic means whereby some of the movable contacts including the control contacts, and subsequently others of the movable contacts are moved in one direction to engage some of the stationary contacts to make one set of circuit connections including a control circuit for the electromagnetic means, and in another direction to disengage some of the said engaged stationary contacts exclusive of the control contacts, and to engage other stationary contacts to make another set of circuit connections, and whereby some of the said engaged contacts exclusive of the control contacts and subsequently the remainder of the contacts are disengaged.

44. In a controlling device for electric circuits, a double-throw switch, a single-throw switch, and a means for simultaneously throwing the single-throw switch and the double-throw switch one way and then throwing the double-throw switch the other way and then throwing both switches.

45. In a controlling device for electric circuits, a two-way switch, a one-way switch, a means for moving the one-way switch and the two-way switch one way and then moving the two-way switch the other way and then moving both switches.

46. In a controlling device for electric circuits, a two-way switch, a one-way switch, there being a normal position for each, a means for simultaneously moving the one-way switch from its normal position and the two-way switch one way from its normal position, and then moving the two-way switch the other way and then moving both switches to their normal positions.

47. In a controlling device for electric circuits, a switch movable in one direction from a normal position, a switch movable in two directions from its normal position, and a means for moving the one-direction switch from its normal position and the two-direction switch in one direction from its normal position, and then moving the two-direction switch in the other direction, and then moving both switches to their normal position.

48. In a controlling device for electric circuits, a switch closable two ways, a switch closable one way, and a means for closing the one-way switch, and subsequently closing the two-way switch one way and then closing the two-way switch the other way, and then opening both switches.

49. In a controlling device for electric circuits, a switch closable in one direction, a switch closable in two directions, and a means for closing the one-direction switch and subsequently closing the two-direction switch in one direction, then closing the two-direction switch in the other direction without opening the one-direction switch, and then opening both switches.

50. In a controlling device for electric circuits, a single-throw switch, a double-throw switch, a normal position for each, and a means for throwing the single-throw switch from its normal position and the double-throw switch one way from its normal position, then throwing the double-throw switch the other way, then throwing the double-throw switch and subsequently the single-throw switch to their normal position.

51. In a controlling device for electric circuits, a switch closable in one position, a switch closable in two positions, and a means for closing the one-position switch and the two-position switch in one position, then closing the two-position switch in the other position without opening the single-position switch, then opening the two-position switch and subsequently the one-position switch.

52. In a controlling device for electric circuits, a single-throw switch, a double-throw switch, and a means for throwing the single-throw switch to close it and subsequently throwing the double-throw switch to close it one way, then throwing the double-throw switch to close it the other way, then opening the double-throw switch and sbsequently the single-throw switch.

53. In a controlling device for electric circuits, a single-throw switch, a double-throw switch, a means for throwing the single-throw switch to close it and subsequently throwing the double-throw switch to close it one way, then throwing the double-throw switch to close it the other way without opening the single-throw switch, then opening the double-throw switch and subsequently the single-throw switch.

54. In a controlling device for electric circuits, an electromagnetic winding, a control circuit therefor, a double-throw switch, a single-throw switch having a contact in the control circuit, and means made operative by the winding to close the single-throw switch and the double-throw switch one way, and then to close the double-throw switch the other way, and then to open both switches.

55. In a controlling device for electric circuits, an electromagnetic winding, a control circuit therefor, a double-throw switch, a single-throw switch having a contact for controlling the control circuit, and means made operative by the winding to close the single-throw switch and subsequently close the double-throw switch one way, and then to close the double-throw switch the other way, and then to open both switches.

56. In a controlling device for electric circuits, an electromagnetic winding, a control circuit therefor, a double-throw switch, a single-throw switch having a contact in the control circuit, and means made operative by the winding to close the single-throw switch and subsequently the double-throw switch one way, and then to close the double-throw switch the other way without opening the single-throw switch, and then to open both switches.

57. In a controlling device for electric circuits, an electromagnetic winding, a control circuit therefor, a double-throw switch, a single-throw switch having a contact in the control circuit, and means made operative by the winding to close the single-throw switch and the double-throw switch one way, and then to close the double-throw switch the other way, and then to open the double-throw switch and subsequently the single-throw switch.

58. In a controlling device for electric circuits, an electromagnetic winding, a control circuit therefor, a double-throw switch, a single-throw switch having a contact in the control circuit, and means made operative by the winding to close the single-throw switch and the double-throw switch one way and then to close the double-throw switch the other way without opening the single-throw switch, and then to open the double-throw switch and subsequently the single-throw switch.

59. In a controlling device for electric circuits, an electromagnetic winding, a control circuit therefor, a double-throw switch, a single-throw switch having a contact in the circuit, and means made operative by the winding to close the single-throw switch and subsequently the double-throw switch one way, and then to close the double-throw switch the other way, and then to open the double-throw switch and subsequently the single-throw switch.

60. In a controlling device for electric circuits, an electro-magnetic winding, a control circuit therefor, a double-throw switch, a single-throw switch having a contact in the control circuit, and means operated by the winding to close the single-throw switch and subsequently the double-throw switch one way, and then to close the double-throw switch the other way without opening the single-throw switch, and then to open the double-throw switch and subsequently the single-throw switch.

61. In a motor control system, a motor, a motor circuit, stationary and movable contacts, a magnet for moving some of and subsequently others of the movable and stationary contacts into mutual engagement to give starting current to the motor, and means acted upon by the magnet whereby energy is stored up and subsequently moves some of the movable and stationary contacts out of mutual engagement and moves other movable and stationary contacts into mutual engagement to give running current to the motor, and moves some of and subsequently the remainder of the mutually engaged contacts out of mutual engagement.

62. In a motor control system, a motor, a motor circuit, stationary and movable contacts, a magnet for moving some of and subsequently others of the movable and stationary contacts into mutual engagement to give starting current to the motor, and means whereby the mechanical power developed by the magnet moves some of the movable and stationary contacts out of mutual engagement and moves other movable and stationary contacts into mutual engagement to give running current to the motor, and for moving some of and subsequently the remainder of the mutually engaged contacts out of mutual engagement.

63. In a motor control system, a motor, a motor circuit, stationary and movable contacts, a magnet, whereby the magnet moves some of and subsequently others of the movable and stationary contacts into mutual engagement to give starting current to the motor and whereby the magnet stores up mechanical energy and subsequently moves some of the movable and stationary contacts out of mutual engagement and moves other movable and stationary contacts into mutual engagement to give running current to the motor, and moves some of and subsequently the remainder of the mutually engaged contacts out of mutual engagement.

64. In a motor control system, a motor, a motor circuit, stationary and movable contacts, a magnet which when it operates to close its magnetic circuit moves some of and subsequently others of the movable and stationary contacts into mutual engagement to give starting current to the motor, and mechanical means acted on by the magnet for subsequently moving some of the movable and stationary contacts out of mutual engagement and for moving other movable and stationary contacts into mutual engagement to give running current to the motor, and for moving some of and subsequently the remainder of the mutually engaged contacts out of mutual engagement.

65. In a motor control system, a motor, a motor circuit, stationary and movable contacts, a magnet which when energized immediately closes its magnetic circuit, and means controlled by the magnet whereby some of and subsequently others of the movable and stationary contacts are moved into mutual engagement to give starting current to the motor and whereby a force is established for subsequently moving some of the movable and stationary contacts out of mutual engagement and for moving other movable and stationary contacts into mutual engagement to give running current to the motor, and for moving some of and subsequently the remainder of the mutually engaged contacts out of mutual engagement.

66. In a motor control system, a motor, a motor circuit, stationary and movable contacts, a single electromagnet, means for developing power by a single operation thereof to move some of and subsequently others of the movable and stationary contacts into mutual engagement to give starting current to the motor, and to subsequently move some of the movable and stationary contacts out of mutual engagement and to move other movable and stationary contacts into mutual engagement to give running current to the motor, and to move some of and subsequently the remainder of the mutually engaged contacts out of mutual engagement.

67. In an induction motor starter of the type having two sets of stationary contacts and a set of movable contacts operated by a single electromagnet to successively engage one set of stationary contacts to give starting connections to the motor, disengage the said stationary contact and engage other stationary contacts to give running connections to the motor, and disengage the engaged contacts and return to the off position, other contacts closed by the operation of the magnet to give starting connections to the motor, held closed by the magnet to maintain the running connections to the motor, and opened and returned to the off position by the magnet.

68. In an induction motor starter of the type having two sets of stationary contacts and a set of movable contacts operated by a single electromagnet to successively engage one set of stationary contacts to give starting connections to the motor, disengage the said stationary contacts and engage other stationary contacts to give running connections to the motor, and disengage the engaged contacts and return to the off position, a maintaining circuit for the magnet, other contacts closed by the operation of the magnet to give starting connections to the motor and establish the maintaining circuit, held closed by the magnet to maintain running connections to the motor and the circuit of the magnet and opened and returned to the off position by the magnet.

69. In an induction motor, a starter of the type having a source of voltage supply, two sets of stationary contacts and a set of movable contacts operated by a single electromagnet to successively engage one set of stationary contacts to give starting connections to the motor, disengage the said stationary contacts and engage other stationary contacts to give running connections to the motor, and disengage the engaged contacts and return to the off position, a maintaining circuit for the magnet, other contacts closed by the operation of the magnet to give starting connections to the motor and establish a maintaining circuit for the electromagnet, held closed by the magnet to maintain running connections to the motor and to maintain the maintaining circuit of the magnet, and opened and returned by the magnet to the off position upon failure of the voltage supply, opening the motor circuit and the maintaining circuit.

70. In an induction motor, a starter of the type having a source of voltage supply, two sets of stationary contacts and a set of movable contacts operated by a single electromagnet to successively engage one set of stationary contacts to give starting connections to the motor, disengage the said stationary contacts and engage other stationary contacts to give running connections to the motor, and disengage the engaged contacts and return to the off position, a maintaining circuit for the magnet, other contacts closed by the operation of the magnet to give starting connections to the motor and to establish a maintaining circuit for the electromagnet, held closed by the magnet to maintain the running connections to the motor and to maintain the maintaining circuit of the magnet, and opened and returned to the off position upon failure of the voltage supply, opening the motor circuit and the maintaining circuit, and means for causing failure of voltage supply.

71. In an induction motor system in which the motor is controlled by a three-phase transformer by employing a magnet which first closes the starting contacts in the circuits for some of the terminals of the transformer, then closes the running contacts for the motor, and finally opens the latter contacts, other contacts in the circuit of the remainder of the terminals of the transformer, and means whereby the said magnet also closes the latter contacts and keeps them closed during the starting and running of the motor and whereby they are opened by the magnet upon the opening of the running contacts.

Signed at Cleveland, this 30th day of November, A. D. 1917.

HARRY F. STRATTON.